Feb. 28, 1950 — L. E. DALY — 2,498,652
LAMINAR STRUCTURE
Filed Oct. 19, 1946
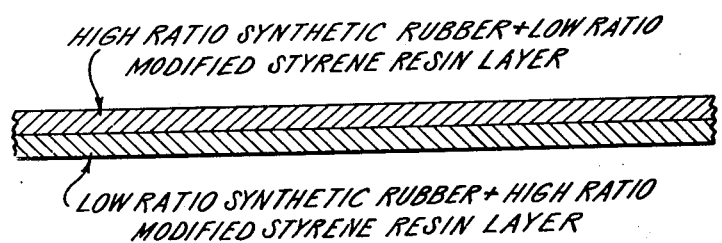
INVENTOR.
LAWRENCE E. DALY
BY Harry Levy
ATTORNEY Patented Feb. 28, 1950

2,498,652

UNITED STATES PATENT OFFICE 2,498,652

LAMINAR STRUCTURE

Lawrence E. Daly, Mishawaka, Ind., assignor to United States Rubber Company, New York, N. Y., a corporation of New Jersey Application October 19, 1946, Serial No. 704,542

5 Claims. (Cl. 154—43)

This invention relates to improvements in laminar structures, more especially to those suitable for containers.

An object of the invention is to provide a shatterproof scar-resistant laminar structure. A further object is to provide such a structure fashioned from molding materials which will be compatible with each other, i. e., capable of being mixed homogeneously and inseparably with each other, and mutually lend themselves, when allied, for conversion into a variety of shapes for the manufacture of luggage, typewriter cases, instrument cases, or the like, without the need for resorting to heavy molds and presses. A further object is to produce a container of pleasing appearance, excellent wearing qualities, and one which is sufficiently rigid to resist any substantial deformation under loads ordinarily encountered by the luggage, etc.

I have discovered I can accomplish these objects by plying together two different types of molding material, one selected for the base stock or inner ply of the container, and the other for the outer or exposed ply. The base ply is composed mainly of a thermoplastic mix of a soft rubbery (elastic) synthetic rubber, that is, a 1,3-butadiene-derived elastic synthetic rubber, especially those of the Buna N or Buna S types, with a hard normally inelastic thermoplastic modified-styrene resin copolymer, more especially one derived from polymerizing styrene with either acrylonitrile or butadiene-1,3; the normally inelastic resin comprises from about 60 to about 90%, preferably 60-70%, by weight of the sum of the weights of the elastic synthetic rubber and the inelastic resin copolymer. The rubber component is correspondingly from 40 to 10%, and preferably 40-30%.

The outer or cover ply is made from the same type of materials which are chosen for the base ply but they are used in different proportions in the cover ply. The outer or cover ply stock is composed mainly of a thermoplastic mix of a rubbery (elastic) synthetic rubber, such as Buna N or Buna S, with a hard normally inelastic thermoplastic resin copolymer derived from polymerizing styrene with either arcrylonitrile or butadiene-1,3; the rubber (i. e., the elastic or rubbery) component comprises 50% and up to 75%, and preferably 50-60%, by weight of the sum of the weight of the rubber and hard inelastic resin components. The 50 resin : 50 rubber mix provides superior abrasion resistance; it is like sole leather. A 25 resin : 75 rubber mix is like upholstery leather.

In using a mixture of a given synthetic rubber with a given inelastic resin for the base stock, it is preferred to use the same kind of synthetic rubber and the same resin in the cover stock. For example, the Buna S type rubber is preferred to the Buna N type rubber for mixture with the normally inelastic butadiene-styrene resin because it mixes more readily than Buna N with such resin. Correspondingly, the Buna N type rubber is preferred to the Buna S type rubber for mixture with the normally inelastic styrene-acrylonitrile resin because it mixes more readily than Buna S with such resin.

The elastic synthetic rubber component referred to has an ultimate elongation of at least 150%; the relatively inelastic hard resins have an elongation of less than 5%.

The term "elastic" refers to the property of being normally extensible and self-retractible to substantially original size and shape.

As is well-known, Buna S (GRS) is a rubbery copolymer of butadiene-1,3 and styrene; and Buna N (also known as Perbunan) is a rubbery copolymer of butadiene-1,3 and acrylonitrile.

The normally hard thermoplastic resinous styrene-acrylonitrile coplymer may be prepared by the emulsion polymerization procedure, disclosed in U. S. Patent No. 2,140,048, using a large amount of the monomeric styrene, e. g., 50–85% by weight of the styrene in the binary mix of monomers, the proportion of the monomeric acrylonitrile being correspondingly from 50 to 15% by weight. In this manner normally hard resinous copolymers, which are non-rubbery at room temperatures, are obtainable with corresponding softening points ranging from about 90° C. to about 108° C. (195° F. to about 226° F.). Increase in the proportion of acrylonitrile gives an increase in the softening temperature of the copolymer resin, which in turn provides for a final composite thermoplastic which is more resistant to deformation at higher temperatures. Other methods such as enmasse copolymerization may also be used. Emulsifying agents and polymerization catalysts, as well as the customary regulators or modifiers used in making GRA (Buna N) may be included, such as those of the mercaptan or other type. A convenient recipe is:

| | Parts by weight |
|---|---|
| Water | 180–400 |
| Peroxidic catalyst | 0.1–1.5 |
| Styrene | 85–50 |
| Acrylonitrile | 15–50 |
| Emulsifying agent | 0.5–150 |
| Modifier | 0–1 |

The normally hard thermoplastic resinous styrene-butadiene copolymer is made by the same general procedure that is used in making the rubbery Buna S or GRS, namely, by emulsion polymerization of the monomeric styrene with the monomeric butadiene, except that the weight ratio of the styrene is increased beyond that which will produce a rubbery copolymer, namely, 80–97 parts, and the butadiene-1,3 is reduced to 20–3 parts, respectively, thereby producing a normally non-rubbery resinous copolymer instead of a rubbery copolymer. The resinous copolymer is recovered from the synthetic latex in the customary manner. Other methods, such as enmasse copolymerization may also be used.

In more detail, the procedure for the latter resin may also employ emulsifying agents such as rosin or other soap, etc., and a polymerization catalyst, as well as the customary regulators or modifiers used in making the rubbery GRS (Buna S) such as the mercaptan or other type. A convenient recipe is:

|  | Parts by weight |
|---|---|
| Water | 180–400 |
| Peroxidic catalyst | 0.1–1.5 |
| Styrene | 80–97 |
| Butadiene-1,3 | 20–3 |
| Emulsifying agent | 0.5–150 |
| Modifier | 0–1 |

In both instances, after the autoclave, which is equipped with a stirrer, is charged with the mixture it is heated, with stirring, until there has been a 90% or better conversion to the desired copolymer resin. Time and temperature are co-related. The temperatures may range from 80° F. to as high as 200° F. At 95° F., about 10–14 hours are needed.

The coagulation may be carried out, with stirring, in any of the conventional ways, by acid (e. g., acetic acid) or salt solution, at room temperature or higher; coagulation by heat may also be employed. The coagulate is separated by filtration or otherwise, washed with water and dried to produce a friable powder. The material may also be prepared in resin powder form by spray-drying the synthetic latex.

The solid styrene-butadiene resin, at room temperatures, such as 20° C., is lacking in elastic (rubber-like) properties, and has a softening temperature of about 30–60° C. (86–140° F.), varying within these limits according to the variation in the proportion of the starting materials and the degree to which the polymerization is controlled. The copolymer resin can be molded to a hard product.

The solid styrene-acrylonitrile resin at room temperatures, such as 20° C., is lacking in elastic (rubber-like) properties; it can be milled into a sheet which is hard, tough and brittle at ordinary room temperatures. It has a softening temperature of about 195° F. to about 226° F., varying within these limits according to the variation in the proportion of the starting materials and the degree to which the polymerization is controlled. The white solid or powder is capable of being milled or molded to a hard tough product, softening at from 10 to 25° C. higher than pure polystyrene which has a softening point of about 80° C.

The softening temperature of the normally inelastic resin extends as low as 86° F. and as high as 226° F., in order to accommodate a variety of uses; the inelastic modified-styrene resin may be further defined as the normally inelastic resinous copolymer of styrene and a vinyl compound of the formula $CH_2=CH-X$ where X is cyanogen (—CN—) or vinyl $$(-CH=CH_2).$$

These normally inelastic resin copolymers have been found to be compatible with, i. e., capable of being mixed homogeneously and inseparably with, the rubber at temperatures of 200–350° F.

A sheet of the calendered base or inner stock and a sheet of the calendered outer or cover stock, each containing vulcanizing ingredients and adjuvants, as desired, for example, the sulfur (½–5% by weight based on the total rubber-resin mix), accelerator, antioxidant, plasticizer, fillers, pigments, are laminated by pressing them together, for example, in a hydraulic press, or otherwise, with the platens heated at a temperature in the range between about 280° F. and about 400° F., the pressures of which may range widely, for example, from about 100 to about 1000 pounds per square inch. After from 10 to 30 minutes the compounds are substantially cured, and shaped. Instead of a platen cure, the sheets may be tiered (stacked) with suitable separators therefor, and cured in a vulcanizing chamber with live steam, and then cooled.

The accompanying drawing shows a section of the laminate.

The decorative surface of the cover stock corresponds to the negative of the surface to which it is pressed. It may be very smooth and shiny, if a smooth polished platen is used; or it may resemble or simulate natural leather, or some particular decorative design, where the platen has been engraved with the desired design. When the cover stock is pressed against the platen, embossed with a leather grain design, a material may be prepared that can be polished with a suitable wax and made to look very much like natural leather. Such a leather substitute can be compounded, with desired pigments, plasticizers, etc., to produce a wide range of materials from white to black.

Ordinarily the cover stock should be cured to a higher degree than the base stock, particularly where it bears a design such as top grain leather or other impression, in order to not lose the design due to increased temperatures that are used when a suitcase or other container is being formed from the laminated blank. There may be occasions however where it is not desired or expedient to have a formulated design on the cover stock, in which case the sulfur or equivalent curing agent may be eliminated entirely.

It is desirable, before removing the laminated sheet from the press, to cool the platens below the softening point of the stock having the lowest softening point, since the sheet is thermoplastic and would deform at elevated temperatures.

The component sheets have flowed together under the action of the heat and pressure to form a single sheet of laminated material. The bond is excellent, and there is generally no line of demarkation where the two stocks have flowed together, assuming they are of the same color.

Where it is desired to mold or shape a laminated sheet into a container, it is desirable to first heat it above its softening temperature, say about 250–300° F., and place or situate it over a mold of the desired shape. It may be shaped to the mold surface by mechanical means or otherwise. For example, a vacuum may be drawn between the mold and the hot plastic laminated sheet, thereby drawing the sheet tightly against the form. Since the sheet under such conditions is soft and pliable, it may be readily formed into a wide variety of shapes. The sheet is desirably maintained in contact with the form, until it has cooled sufficiently, so that it will not deform on or after removal from the form.

Various other molding and shaping techniques may be used including those shown in Leary U. S. Patent No. 2,377,946.

In the manufacture of luggage, it is usual to form shells corresponding to one-half of the case. These shells are fitted together with hinges and closures, as desired, to complete the case, except for any desired appurtenances.

The form upon which the shells are fashioned may be wood, plaster of Paris, metal, or otherwise.

In the manufacture of an instrument case, for example, a clarinet case, where the instrument is divided, and the instrument parts are to be placed in suitable slots, the negative mold may be made, for example, from wood or plaster of Paris, and by means of the vacuum method, a case with suitable slots or partitions may be formed.

The stiff inner or base sheet provides the structural strength of the laminate and may vary in thickness, as desired; it usually is from about $\frac{1}{16}''$ to about $\frac{3}{16}''$, according to the requirements of the particular container to be fabricated.

The cover or outer ply may also vary as desired, being usually from about .010'' to about .060'' in thickness. Such a sheet is quite flexible, similar to leather, and has a Shore Type A durometer reading of about 60 to about 95, depending upon the amount of the normally inelastic thermoplastic resin incorporated with the rubber. It has exceptional resistance to abrasion and therefore serves well as a cover for a container or other shaped article, which is subject to much abuse, scuffing, etc.

The following example is given to illustrate the invention, without limitation thereto, the parts being by weight:

*Example 1*

| Base Stock | Parts | Cover Stock | Parts |
|---|---|---|---|
| Normally inelastic resinous styrene-acrylonitrile copolymer (contains about 15-30% of acrylonitrile). | 66 | Normally inelastic resinous styrene-acrylonitrile copolymer (15-30% acrylonitrile). | 25 |
| Buna N | 34 | Buna N | 75 |
| Zinc oxide | 3 | Zinc oxide | ¹5 |
| Stearic acid | 1 | Stearic acid | 2 |
| Altax (benzothiazyl disulphide) (Accelerator) | 1 | Altax | 1.5 |
| Sulfur | 1.5 | Sulfur | 1.5 |

¹The increased amounts are to get a "tight" cure in the cover stock to prevent losing the leather or other impression at molding temperatures during shaping.

These respective stocks are mixed on a rubber mill. The mill is heated to a temperature sufficient to soften and blend, i. e., form a homogeneous mix of the normally inelastic resinous copolymer with the synthetic rubber, for example, temperatures from about 200 to about 350° F. may be used. The copolymer resin is first banded on the mill and then the synthetic rubber is added slowly until it is thoroughly mixed in. The other compounding ingredients are then added, the sulfur being withheld until the temperature of the stock has been reduced to about 200-275° F., to avoid precure where such precure is undesirable. The separate stocks are then made ready to be plied up when desired, as set forth above.

The following base and cover stocks may be treated in a similar manner.

*Example 2*

| Base Stock | Parts | Cover Stock | Parts |
|---|---|---|---|
| Normally inelastic thermoplastic butadiene-styrene copolymer (softening point approximately 140° F.). | 70 | Normally inelastic thermoplastic butadiene-styrene copolymer (softening point approximately 140° F.). | 25 |
| Rubber-like copolymer of butadiene and styrene (GRS). | 30 | Rubber-like copolymer of butadiene and styrene (GRS). | 75 |
| Zinc oxide | 2 | Zinc oxide | 5 |
| Stearic Acid | 1 | Stearic Acid | 2 |
| Agerite White | 1 | Agerite White | 1 |
| Altax | 1.5 | Altax | 1.5 |
| Sulfur | 1.0 | Sulfur | 1.5 |

The temperature of the platen surface contiguous the cover stock containing a design such as top grain leather or other impression, may be adjusted differently, i. e., higher from that of the platen surface adjacent the base stock, whereby to give the cover stock a higher degree of cure, that is, a "tighter cure" than the base stock. Additional sulfur can also be added to the cover stock for such a purpose. The design or impression will thereby be better preserved in the subsequent molding and shaping operations using increased temperatures.

The expression "elastic" has the usual meaning of referring to a property of being normally extensible and self-retractible to substantially original size and shape. Inelastic means the absence of such a property at normal room temperatures (e. g., 20° C.).

While I have shown and described various embodiments of the invention, it is to be understood that the invention is susceptible to other modifications which appear within the spirit of the invention and the scope of the appended claims.

Having thus described my invention, what I claim and desire to protect by Letters Patent is:

1. A shatterproof scar-resistant laminar structure comprising a normally hard tough thermoplastic base sheet composed mainly of a composite thermoplastic homogeneous mixture of an elastic rubbery copolymer selected from the group consisting of (A) rubbery copolymers of butadiene-1,3 and styrene and (B) rubbery copolymers of butadiene-1,3 and acrylonitrile and a hard normally inelastic resinous thermoplastic copolymer selected from the group consisting of (C)

resinous copolymers of monomers consisting essentially of styrene and butadiene-1,3 in proportions ranging from 80 to 97 percent by weight of styrene and correspondingly by from 20 to 3 percent by weight of butadiene-1,3 and (D) resinous copolymers of monomers consisting essentially of styrene and acrylonitrile in proportions ranging from 50 to 85 percent by weight of styrene and correspondingly from 50 to 15 percent by weight of acrylonitrile, a resinous copolymer (C) being used when a rubbery copolymer (A) is used and a resinous copolymer (D) being used when a rubbery copolymer (B) is used, said resinous copolymer constituting from 60 to 90 percent by weight of the sum of the weights of said rubbery copolymer and said resinous copolymer, said base sheet having bonded integrally to one face thereof by coalescence under the action of heat and pressure a sheet composed mainly of a composite thermoplastic homogeneous mixture of the same rubbery and resinous copolymers that are used in said base sheet but in which the rubbery copolymer is present in proportion ranging from 50 to 75 percent by weight of the sum of the weights of said rubbery copolymer and said resinous copolymer.

2. A shatterproof scar-resistant laminar structure comprising a normally hard tough thermoplastic base sheet composed mainly of a composite thermoplastic homogeneous mixture of an elastic rubbery copolymer of butadiene-1,3 and styrene and a hard normally inelastic resinous thermoplastic copolymer of monomers consisting essentially of styrene and butadiene-1,3 in proportions ranging from 80 to 97 percent by weight of styrene and correspondingly from 20 to 3 percent by weight of butadiene-1,3, said resinous copolymer constituting from 60 to 90 percent by weight of the sum of the weights of said rubbery copolymer and said resinous copolymer, said base sheet having bonded integrally to one face thereof by coalescence under the action of heat and pressure a sheet composed mainly of a composite thermoplastic homogeneous mixture of said rubbery copolymer and said resinous copolymer wherein said rubbery copolymer is present in proportion ranging from 50 to 75 percent by weight of the sum of the weights of said rubbery copolymer and said resinous copolymer.

3. A shatterproof scar-resistant laminar structure comprising a normally hard tough thermoplastic base sheet composed mainly of a composite thermoplastic homogeneous mixture of an elastic rubbery copolymer of butadiene-1,3 and styrene and a hard normally inelastic resinous thermoplastic copolymer of monomers consisting essentially of styrene and butadiene-1,3 in proportions ranging from 80 to 97 percent by weight of styrene and correspondingly from 20 to 3 percent by weight of butadiene-1,3, said resinous copolymer constituting from 60 to 70 percent by weight of the sum of the weights of said rubbery copolymer and said resinous copolymer, said base sheet having bonded integrally to one face thereof by coalescence under the action of heat and pressure a sheet composed mainly of a composite thermoplastic homogenous mixture of said rubbery copolymer and said resinous copolymer wherein said rubbery copolymer is present in proportion ranging from 50 to 60 percent by weight of the sum of the weights of said rubbery copolymer and said resinous copolymer.

4. A shatterproof scar-resistant laminar structure comprising a normally hard tough thermoplastic base sheet composed mainly of a composite thermoplastic homogeneous mixture of an elastic rubbery copolymer of butadiene-1,3 and acrylonitrile and a hard normally inelastic resinous thermoplastic copolymer of monomers consisting essentially of styrene and acrylonitrile in proportions ranging from 50 to 85 percent by weight of styrene and correspondingly from 50 to 15 percent by weight of acrylonitrile, said resinous copolymer constituting from 60 to 90 percent by weight of the sum of the weights of said rubbery copolymer and said resinous copolymer, said base sheet having bonded integrally to one face thereof by coalescence under the action of heat and pressure a sheet composed mainly of a composite thermoplastic homogeneous mixture of said rubbery copolymer and said resinous copolymer wherein said rubbery copolymer is present in proportion ranging from 50 to 75 percent by weight of the sum of the weights of said rubbery copolymer and said resinous copolymer.

5. A shatterproof scar-resistant laminar structure comprising a normally hard tough thermoplastic base sheet composed mainly of a composite thermoplastic homogeneous mixture of an elastic rubbery copolymer of butadiene-1,3 and acrylonitrile and a hard normally inelastic resinous thermoplastic copolymer of monomers consisting essentially of styrene and acrylonitrile in proportions ranging from 50 to 85 percent by weight of styrene and correspondingly from 50 to 15 percent by weight of acrylonitrile, said resinous copolymer constituting from 60 to 70 percent by weight of the sum of the weights of said rubbery copolymer and said resinous copolymer, said base sheet having bonded integrally to one face thereof by coalescence under the action of heat and pressure a sheet composed mainly of a composite thermoplastic homogeneous mixture of said rubbery copolymer and said resinous copolymer wherein said rubbery copolymer is present in proportion ranging from 50 to 60 percent by weight of the sum of the weights of said rubbery copolymer and said resinous copolymer.

LAWRENCE E. DALY.

REFERENCES CITED

The following references are of record in the file of this patent:

UNITED STATES PATENTS

| Number | Name | Date |
|---|---|---|
| 819,765 | Kiel | May 8, 1906 |
| 2,140,048 | Fikentscher | Dec. 13, 1938 |
| 2,439,202 | Daly | Apr. 6, 1948 |

OTHER REFERENCES

India Rubber World (I), Feb. 1945, page 590.
India Rubber World (II), Jan. 1945, page 422.
Aiken: Modern Plastics, Feb. 1947 (pages 100-102).
Borders et al.: I & E Chem., Sept. 1946 (pages 955-958).